US012439389B2

(12) United States Patent
Abotabl et al.

(10) Patent No.: US 12,439,389 B2
(45) Date of Patent: *Oct. 7, 2025

(54) RESOURCE SKIPPING FOR PARTIAL UPLINK TRANSMISSIONS

(71) Applicant: QUALCOMM Incorporated, San Diego, CA (US)

(72) Inventors: Ahmed Attia Abotabl, San Diego, CA (US); Marwen Zorgui, San Diego, CA (US); Huilin Xu, Temecula, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 18/151,036

(22) Filed: Jan. 6, 2023

(65) Prior Publication Data

US 2024/0236954 A1 Jul. 11, 2024

(51) Int. Cl.
*H04W 72/0446* (2023.01)

(52) U.S. Cl.
CPC ............... *H04W 72/0446* (2013.01)

(58) Field of Classification Search
CPC ................................. H04W 72/0446
See application file for complete search history.

(56) References Cited

U.S. PATENT DOCUMENTS

| 11,160,099 | B2* | 10/2021 | Babaei ............... H04W 74/002 |
| 12,328,765 | B2* | 6/2025 | Hassan ............ H04W 74/0816 |
| 2023/0397216 | A1* | 12/2023 | Kang ............... H04W 72/1268 |
| 2024/0040575 | A1* | 2/2024 | Maamari .............. H04L 5/0012 |
| 2024/0195596 | A1* | 6/2024 | Abotabl .................. H04L 5/16 |

FOREIGN PATENT DOCUMENTS

KR     20230156142 A   * 11/2023       H04W 72/232

\* cited by examiner

*Primary Examiner* — Melvin C Marcelo

(74) *Attorney, Agent, or Firm* — Harrity & Harrity, LLP

(57) ABSTRACT

Various aspects of the present disclosure generally relate to wireless communication. In some aspects, a user equipment (UE) may receive segmentation information that indicates a plurality of slot segments within an uplink slot and that indicates a skipping order for the plurality of slot segments. The UE may initiate a partial uplink transmission. The UE may perform resource skipping in one or more slot segments of the plurality of slot segments based at least in part on the segmentation information. Numerous other aspects are described.

30 Claims, 14 Drawing Sheets

RESOURCE SKIPPING FOR PARTIAL UPLINK TRANSMISSIONS

FIELD OF THE DISCLOSURE

Aspects of the present disclosure generally relate to wireless communication and to techniques and apparatuses for resource skipping for partial uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive segmentation information that indicates a plurality of slot segments within an uplink slot and that indicates a skipping order for the plurality of slot segments. The one or more processors may be configured to initiate a partial uplink transmission. The one or more processors may be configured to perform resource skipping in one or more slot segments of the plurality of slot segments based at least in part on the segmentation information.

Some aspects described herein relate to a network node for wireless communication. The network node may include a memory and one or more processors coupled to the memory. The one or more processors may be configured to transmit segmentation information that indicates a plurality of slot segments within an uplink slot and that indicates a skipping order for the plurality of slot segments. The one or more processors may be configured to detect a partial uplink transmission by performing resource skipping in one or more slot segments of the plurality of slot segments based at least in part on the segmentation information.

Some aspects described herein relate to a method of wireless communication performed by a UE. The method may include receiving segmentation information that indicates a plurality of slot segments within an uplink slot and that indicates a skipping order for the plurality of slot segments. The method may include initiating a partial uplink transmission. The method may include performing resource skipping in one or more slot segments of the plurality of slot segments based at least in part on the segmentation information.

Some aspects described herein relate to a method of wireless communication performed by a network node. The method may include transmitting segmentation information that indicates a plurality of slot segments within an uplink slot and that indicates a skipping order for the plurality of slot segments. The method may include detecting a partial uplink transmission by performing resource skipping in one or more slot segments of the plurality of slot segments based at least in part on the segmentation information.

Some aspects described herein relate to a non-transitory computer-readable medium that stores a set of instructions for wireless communication by a UE. The set of instructions, when executed by one or more processors of the UE, may cause the UE to receive segmentation information that indicates a plurality of slot segments within an uplink slot and that indicates a skipping order for the plurality of slot segments. The set of instructions, when executed by one or more processors of the UE, may cause the UE to initiate a partial uplink transmission. The set of instructions, when executed by one or more processors of the UE, may cause the UE to perform resource skipping in one or more slot segments of the plurality of slot segments based at least in part on the segmentation information.

Some aspects described herein relate to a non-transitory computer-readable medium that stores a set of instructions for wireless communication by a network node. The set of instructions, when executed by one or more processors of the network node, may cause the network node to transmit segmentation information that indicates a plurality of slot segments within an uplink slot and that indicates a skipping order for the plurality of slot segments. The set of instructions, when executed by one or more processors of the network node, may cause the network node to detect a partial uplink transmission by performing resource skipping in one or more slot segments of the plurality of slot segments based at least in part on the segmentation information.

Some aspects described herein relate to an apparatus for wireless communication. The apparatus may include means for receiving segmentation information that indicates a plurality of slot segments within an uplink slot and that indicates a skipping order for the plurality of slot segments. The apparatus may include means for initiating a partial uplink transmission. The apparatus may include means for performing resource skipping in one or more slot segments of the plurality of slot segments based at least in part on the segmentation information.

Some aspects described herein relate to an apparatus for wireless communication. The apparatus may include means for transmitting segmentation information that indicates a plurality of slot segments within an uplink slot and that indicates a skipping order for the plurality of slot segments. The apparatus may include means for detecting a partial uplink transmission by performing resource skipping in one or more slot segments of the plurality of slot segments based at least in part on the segmentation information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
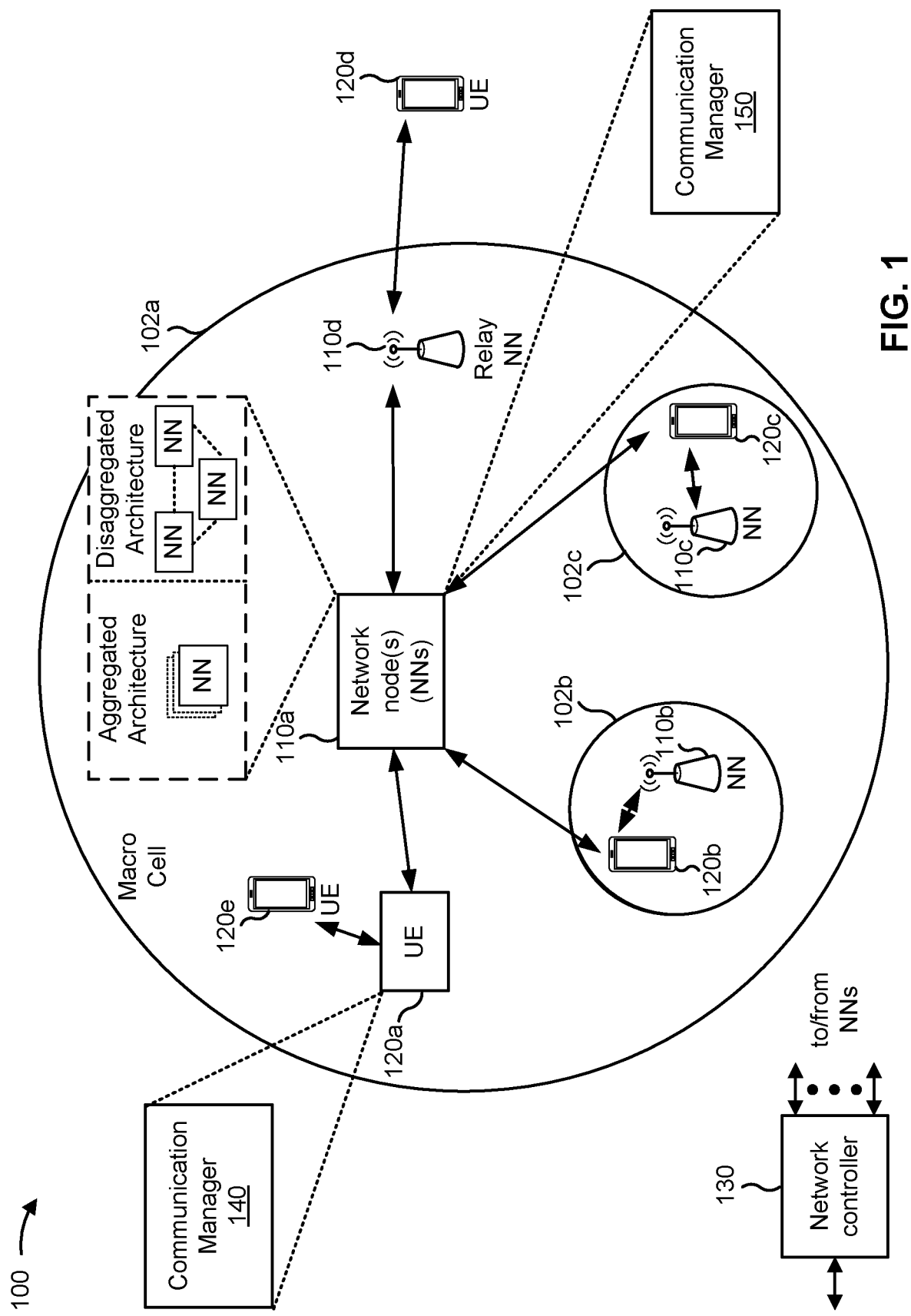
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive segmentation information that indicates a plurality of slot segments within an uplink slot and that indicates a skipping order for the plurality of slot segments; initiate a partial uplink transmission; and perform resource skipping in one or more slot segments of the plurality of slot segments based at least in part on the segmentation information. Additionally, or alternatively, the communication manager 140 may perform one or more other operations described herein.

In some aspects, the network node 110 may include a communication manager 150. As described in more detail elsewhere herein, the communication manager 150 may transmit segmentation information that indicates a plurality of slot segments within an uplink slot and that indicates a skipping order for the plurality of slot segments; and detect a partial uplink transmission by performing resource skipping in one or more slot segments of the plurality of slot segments based at least in part on the segmentation information. Additionally, or alternatively, the communication manager 150 may perform one or more other operations described herein.

As indicated above, FIG. 1 is provided as an example. Other examples may differ from what is described with regard to FIG. 1.

Figure 2:
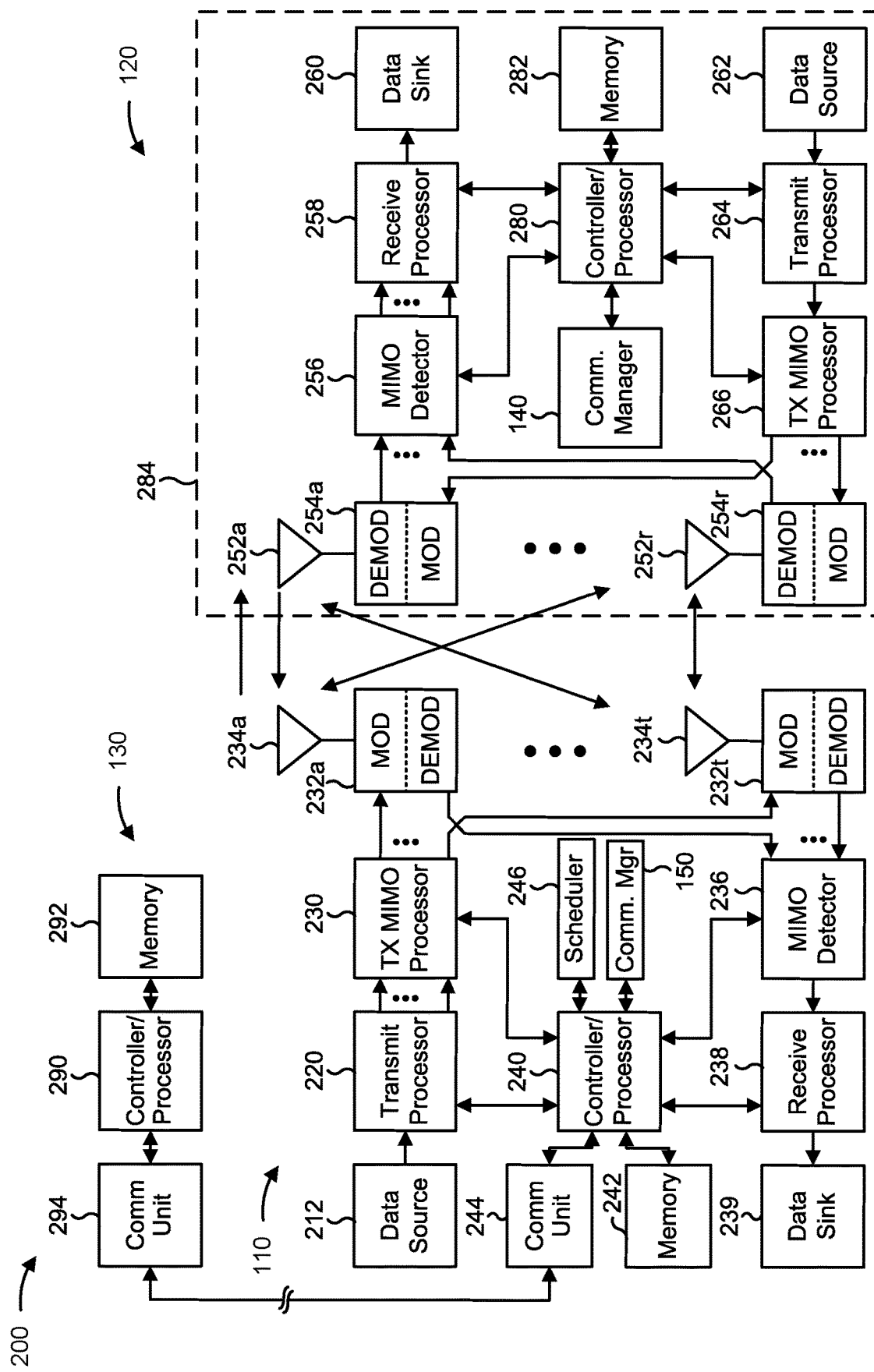
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the network node 110, the controller/processor 280 of the UE 120, and/or any other component(s) of FIG. 2 may perform one or more techniques associated with resource skipping for partial uplink transmissions, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving segmentation information that indicates a plurality of slot segments within an uplink slot and that indicates a skipping order for the plurality of slot segments; means for initiating a partial uplink transmission; and/or means for performing resource skipping in one or more slot segments of the plurality of slot segments based at least in part on the segmentation information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting segmentation information that indicates a plurality of slot segments within an uplink slot and that indicates a skipping order for the plurality of slot segments; and/or means for detecting a partial uplink transmission by performing resource skipping in one or more slot segments of the plurality of slot segments based at least in part on the segmentation information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
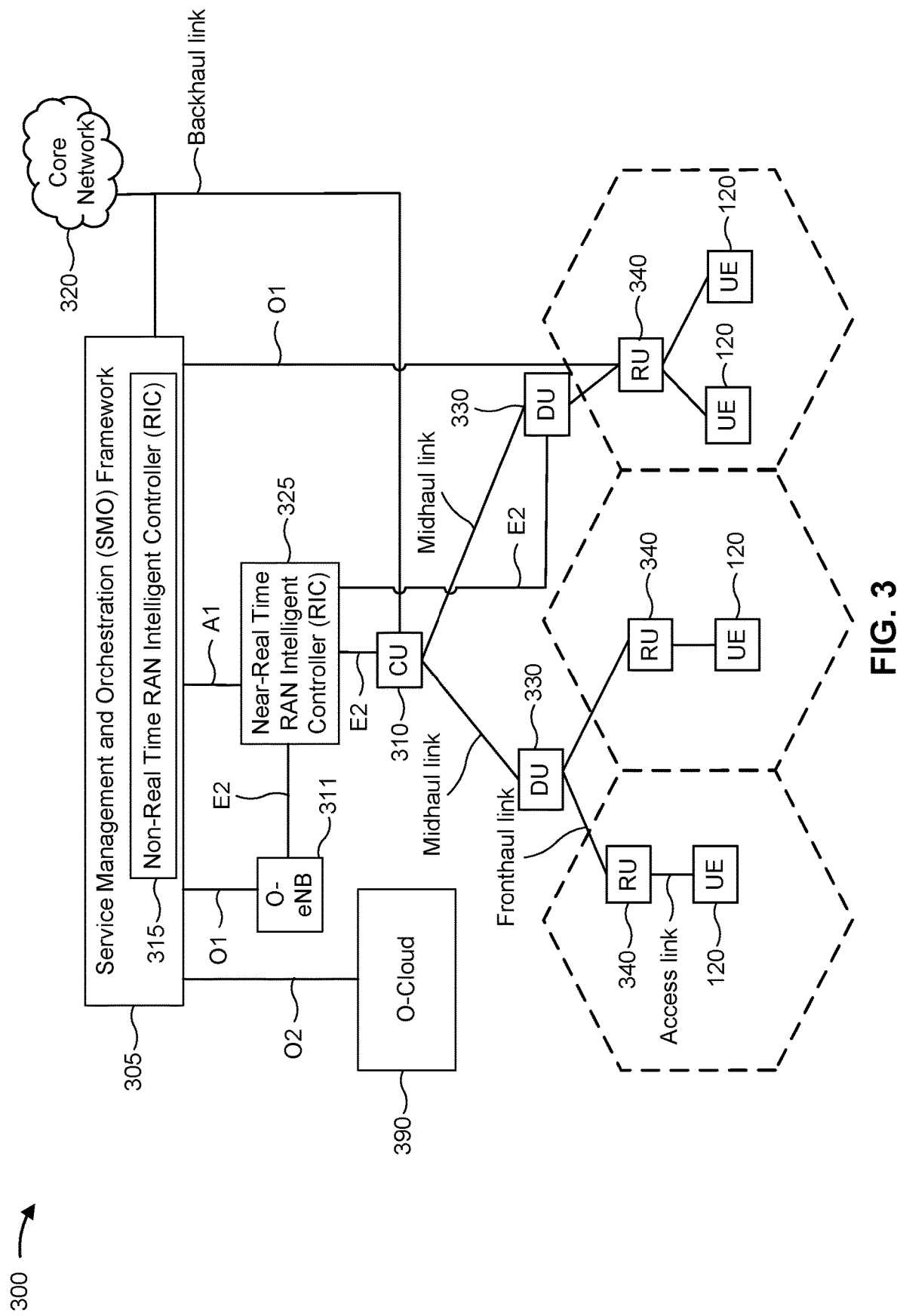
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
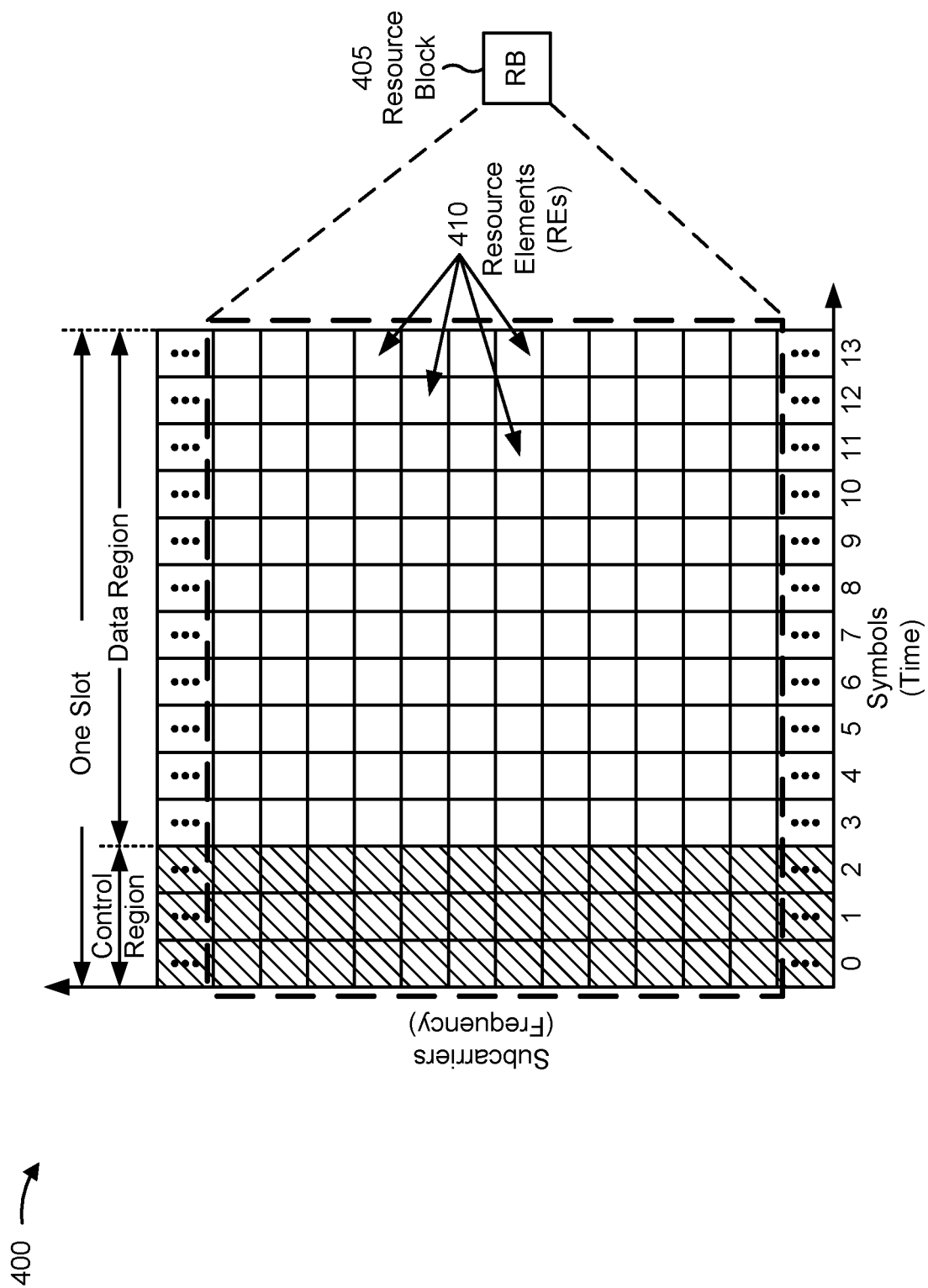
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a network node 110 as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

Figure 5:
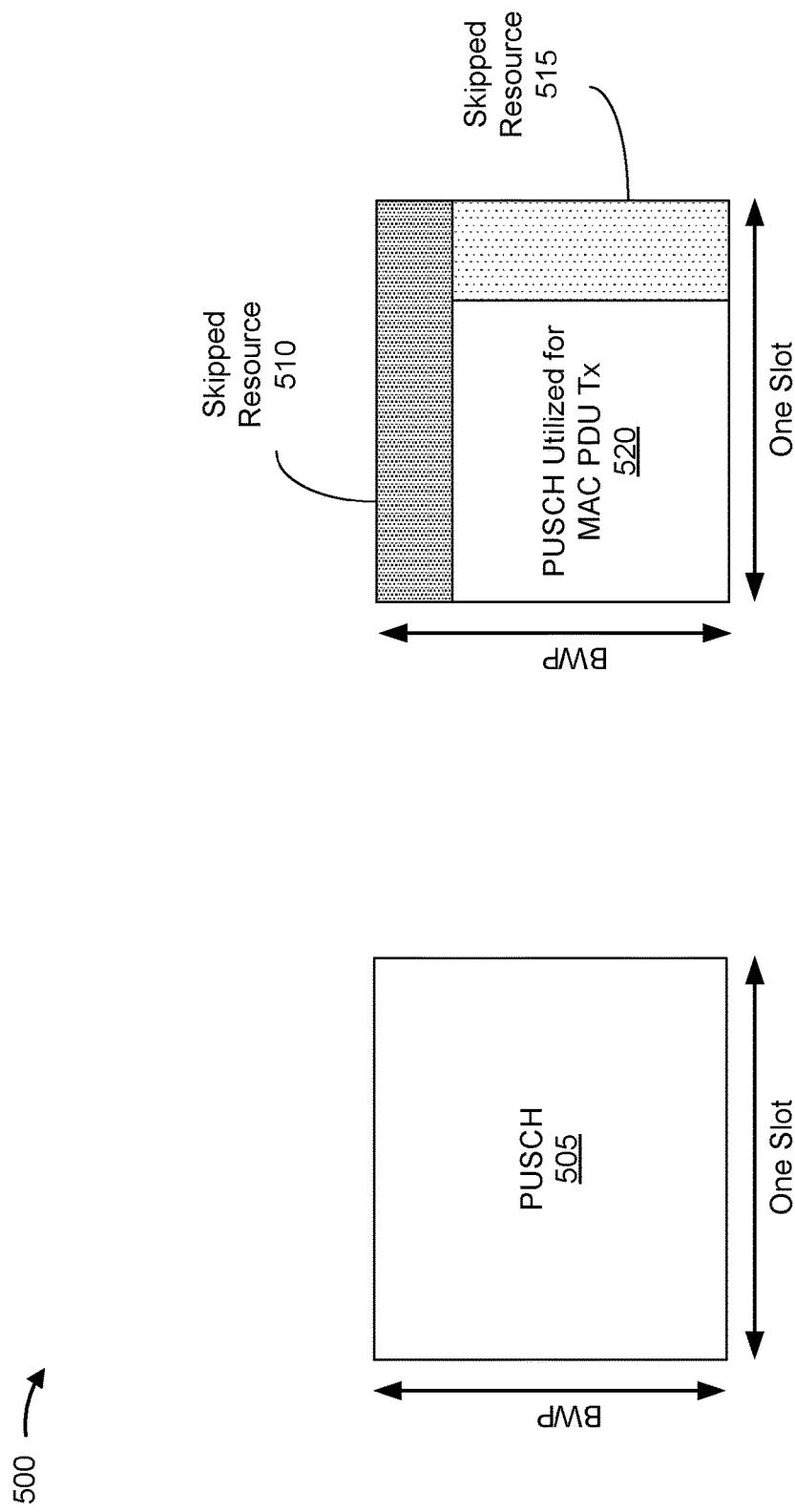
FIG. 5 is a diagram illustrating an example of partial uplink transmissions, in accordance with the present disclosure.

FIG. 5 is a diagram illustrating an example 500 of partial uplink transmissions, in accordance with the present disclosure. In some cases, a resource allocation may be over-allocated by the network node 110. This may occur, for example, when the network node 110 does not receive regular or periodic buffer status reports (BSRs). In this case, an amount of data to be transmitted by the UE 120 may be smaller than the resource allocation. When the UE 120 does not have enough data to fill the allocated resources, the UE 120 may pad one or more zeros to the transport block and may transmit the data (with the appended zeros) using the allocated resources. However, this may result in wasted network resources. In some other cases, the UE 120 may skip the entire transmission based at least in part on the UE 120 not having enough data to transmit in the allocated resources. This may also result in wasted network resources and may result in dropped transmissions.

In some cases, the UE 120 may perform a partial uplink transmission. The partial uplink transmission may include transmitting data in some of the allocated resources but not transmitting data in some others of the allocated resources. For example, the UE 120 may transmit data on a smaller set of allocated resources instead of appending bits to the data transmission to fit the initial resource allocation. In one example, the network node 110 may allocate physical uplink shared channel (PUSCH) resources 505 to be used by the UE 120. The UE 120 may skip a first set of resources 510 and a second set of resources 515 within the PUSCH 505. The UE 120 may perform a data transmission within the remaining resources. For example, the UE 120 may perform a transmission within the PUSCH utilized for MAC protocol data unit (PDU) transmissions 520.

As indicated above, FIG. 5 is provided as an example. Other examples are possible and may differ from what was described with respect to FIG. 5.

While a UE may skip transmission of certain resources for a partial uplink transmission, the UE may perform resource skipping in a variety of ways. The recipient of the partial uplink transmission, such as a network node, may be unaware of which resources the UE is skipping, which may cause the network node to perform blind decoding for all allocated resources. This may increase processing resource usage of the network node and lead to inefficient usage of network resources, as uplink resources may be allocated but un-used.

Some techniques and apparatuses described herein enable partial uplink transmissions with predefined segmentation. For example, a UE may receive segmentation information from a network node, and the segmentation information may indicate multiple slot segments for an uplink slot and a skipping order for the slot segments. When performing a partial uplink transmission, the UE may perform resource skipping based at least in part on the segmentation information. As a result, the UE may follow a predefined skipping order for partial uplink transmissions, which may enable the UE to avoid unnecessary padding of uplink grant resources and/or skipping partial uplink transmissions. In addition, the recipient (e.g., a network node) may be aware of the skipping order (e.g., based on configuration and/or uplink indication), which may enable the recipient to detect partial uplink transmissions using the skipping order, which may avoid blind decoding. In this way, resource skipping for partial uplink transmissions may enable processing resources and network resources to be conserved by reducing processing and network overhead that might otherwise be used by padding, skipping transmissions, blind decoding, and/or retransmissions.

Figure 6:
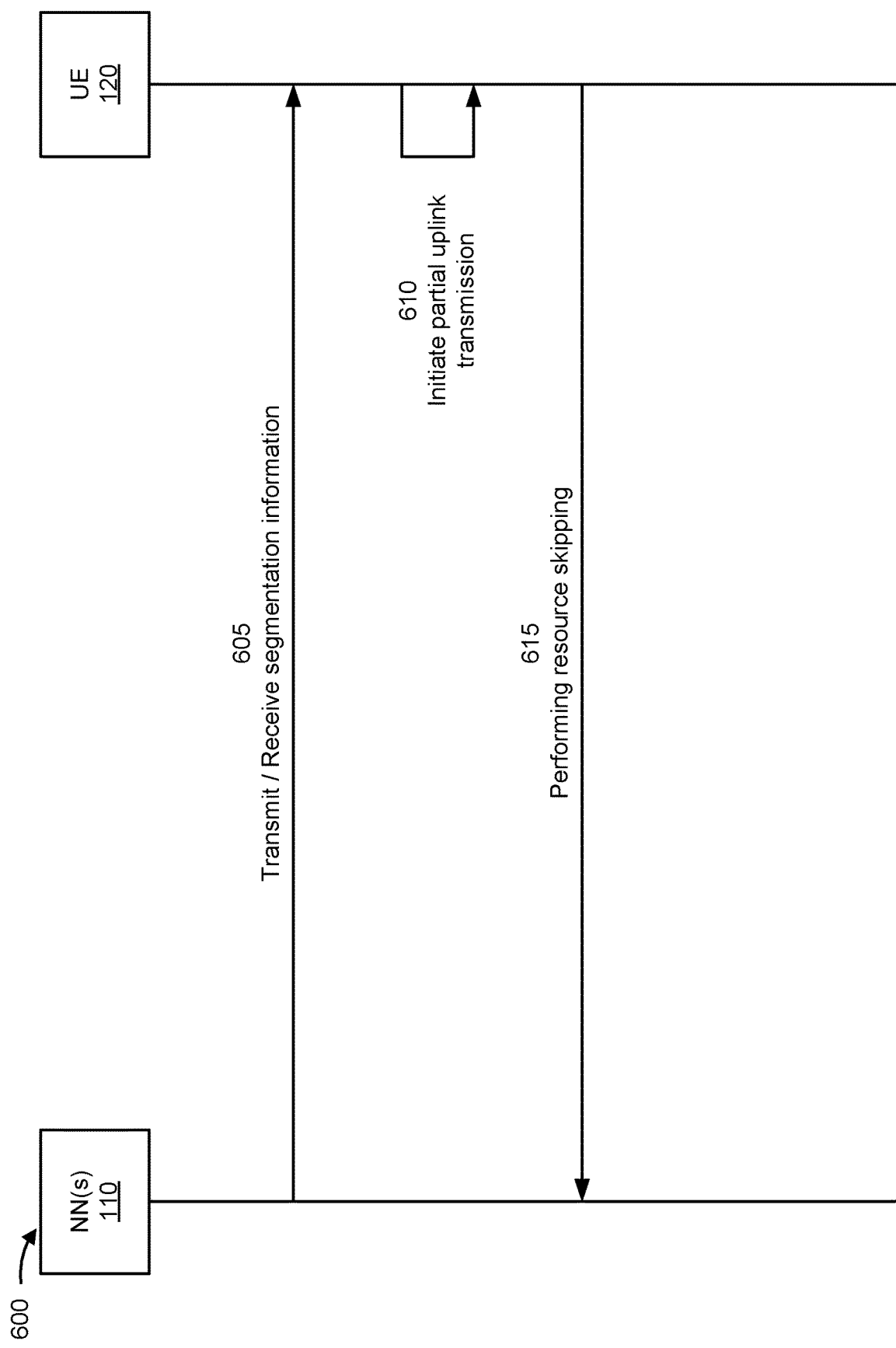
FIG. 6 is a diagram of an example associated with resource skipping for partial uplink transmissions, in accordance with the present disclosure.

FIG. 6 is a diagram of an example 600 associated with resource skipping for partial uplink transmissions, in accordance with the present disclosure. As shown in FIG. 6, a network node (e.g., network node 110) may communicate with a UE (e.g., UE 120). In some aspects, the network node and the UE may be part of a wireless network (e.g., wireless network 100). In some aspects, actions described as being performed by the network node may be performed by multiple different network nodes. For example, configuration actions may be performed by a first network node (e.g., a CU and/or a DU), and radio communication actions may be performed by a second network node (e.g., a DU and/or an RU). The UE and the network node may have established a wireless connection prior to operations shown in FIG. 6.

In some aspects, the network node may transmit (directly or via one or more other network nodes), and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to receive segmentation information indicating slot segments and a skipping order for partial uplink transmissions. The configuration information may indicate the manner in which the slots are segmented and an order in which resources allocated for the partial uplink transmission are to be transmitted, as described herein. In some aspects, the skipping order may be based at least in part on one or more communication parameters. For example, to avoid interference, the network may configure the skipping order to skip an upper frequency slot segment and/or a lower frequency slot segment before a middle frequency slot segment, as the upper and lower frequency regions of a slot are more likely to interfere with adjacent frequencies than the middle frequency region of a slot. Additionally, or alternatively, the network may configure the skipping order to skip at least one slot segment at a later slot symbol before skipping another slot segment at a slot symbol before the later slot symbol, as skipping later slot segments may free up the later slot segments for other communications and be less likely to interfere with communications in a subsequent slot.

The UE may configure itself based at least in part on the configuration information. In some aspects, the UE may be configured to perform one or more operations described herein based at least in part on the configuration information.

As shown by reference number 605, the network node may transmit, and the UE may receive (directly or via one or more other network nodes), segmentation information. The segmentation information may indicate multiple slot segments within an uplink slot and may also indicate a skipping order for the slot segments. In some aspects, at least a portion of the segmentation information may be received via radio resource control communication, and in some aspects, at least a portion of the segmentation information may be received via an uplink grant. For example, the slot segments, and the order in which the slot segments are skipped, can be configured via radio resource control and/or indicated via an uplink grant that allocates resources for an uplink communication.

In some aspects, the slot segments and/or the skipping order may be indicated using a radio resource control configured table. For example, a table with multiple slot segmentation and/or skipping order configurations may be configured via radio resource control. The slot segmentation and skipping order used may then be indicated after the table is configured, e.g., via indication included in or otherwise associated with radio resource control, the uplink grant, a time domain resource allocation value, or another indication.

In some aspects, the segmentation information identifies the slot segments in a time domain and a frequency domain using a symbol index and/or a resource block index. At least a portion of the segmentation information may be jointly encoded, e.g., in the same manner or a manner similar to a resource indicator value (RIV).

As shown by reference number 610, the UE may initiate a partial uplink transmission. For example, the UE may determine that an uplink communication to be transmitted by the UE will not use all resources allocated by an uplink grant. In this situation, the UE may initiate a partial uplink transmission to avoid using all allocated resources, which may enable un-used resources to be used for other communications and/or enable power saving by the UE.

In some aspects, every portion of an uplink slot is associated with one of the slot segments. In this situation, the entire bandwidth part may be subject to segmentation, enabling partial uplink transmissions to skip any resource for an uplink slot.

As shown by reference number 615, the UE and/or the network node may perform resource skipping for transmittal and/or reception of the partial uplink transmission. The resource skipping may be performed in one or more slot segments of the slot segments indicated by the segmentation information, e.g., based at least in part on the skipping order.

In some aspects, the partial uplink transmission is associated with an uplink grant identifying uplink resources, and wherein the resource skipping is performed based at least in part on an overlap of the uplink resources with the slot segments. For example, an uplink grant may allocate resources for an uplink transmission in an uplink slot. The allocated resources may span multiple slot segments. In a situation where the UE does not have enough data to transmit to fill the allocated resources, the UE may skip using portions of the allocated resources that overlap with the slot segments following the skipping order. In some aspects, the UE may skip resources in order, until the UE can no longer skip a resource and still transmit all of the data the UE is to transmit in the uplink slot.

In some aspects, the partial uplink transmission is associated with an uplink grant for transmission of a transport block over multiple slots. In some aspects, the skipping order may be assigned across multiple uplink slots, such as multiple uplink slots of an uplink communication that includes a transmission of a transport block over multiple slots. In a situation where the skipping order spans multiple slots, there are multiple ways that the skipping order may be defined.

In some aspects, a later uplink slot, of multiple uplink slots, may include at least one slot segment ordered for resource skipping prior to at least one slot segment of a prior uplink slot of the multiple uplink slots. For example, given two consecutive uplink slots, slot segments may have a skipping order that results in slot segments in the second slot being skipped before some later-ordered slot segments of the first slot. In some aspects, the skipping order rotates between each uplink slot associated with the uplink grant, and sequentially ordered slot segments are in separate uplink slots. For example, given three uplink slots, the skipping order may indicate the first slot segment to be skipped in the first slot, the second slot segment to be skipped in the second slot, and the third slot segment to be skipped in the third slot, and so on, and the skipping order may wrap back to the first slot.

In some aspects, a skipping order for a first uplink slot may match another skipping order for a second uplink slot of multiple slots. For example, the skipping order may be the same for each uplink slot in a communication that spans multiple uplink slots. In this situation, the UE may perform the resource skipping for a first slot segment of the first uplink slot and perform the resource skipping for a second slot segment of the second uplink slot based at least in part on the second slot segment having a same skipping order as the first slot segment.

In some aspects, the skipping order indicates that all of the slot segments within a first uplink slot are ordered for skipping before any slot segments of any subsequent uplink slot of multiple slots. For example, in transmission spanning three slots, the UE may skip resources of the first slot before skipping any resources of the second slot and may skip resources of the second slot before skipping any resources of the third slot.

In some aspects, PUSCH repetitions are configured for the partial uplink transmission. In this situation, the different PUSCH repetitions of the partial uplink transmission may be transmitted so that the segmentation and partial uplink transmission is the same for each repetition. For example, in a situation where frequency hopping is configured for the PUSCH repetitions, respective partial uplink transmissions for each PUSCH repetition match one another, such that the partial uplink transmissions are each the same as the first repetition, rather than having different resource skipping performed for different PUSCH repetitions.

In some aspects, the uplink slot associated with the partial uplink transmission is one of multiple uplink slots associated with a multi-slot PUSCH communication, and all available resources are used for uplink grants prior to the uplink slot associated with the partial uplink transmission, and all uplink grants following the uplink slot are skipped. For example, if a multi-slot PUSCH is scheduled over four slots, and the data to be transmitted by the UE only fills two of the four resource allocations, the UE may transmit in the first two slots without skipping, perform a partial uplink transmission with resource skipping in the third slot, and skip transmitting in the fourth slot entirely.

In some aspects, the UE may transmit, and the network node may receive, an indication for the resource skipping. In some aspects, the indication may include an uplink control information index and/or a demodulation reference signal sequence. The indication may be used, for example, by the network node to determine when to apply resource skipping for reception of the partial uplink transmission. This may enable the network node to avoid attempting to receive and/or decode skipped resources.

As indicated above, FIG. 6 is provided as an example. Other examples may differ from what is described with respect to FIG. 6.

As a result of the operations described in connection with FIG. 6, the UE may follow a predefined skipping order for partial uplink transmissions, which may enable the UE to avoid unnecessary padding of uplink grant resources and/or skipping partial uplink transmissions. In addition, the network node may be aware of the skipping order (e.g., based on configuration and/or uplink indication), which may enable the recipient to detect partial uplink transmissions using the skipping order, which may avoid blind decoding. In this way, resource skipping for partial uplink transmissions may enable processing resources and network resources to be conserved by reducing processing and network overhead that might otherwise be used by padding, skipping transmissions, blind decoding, and/or retransmissions.

Figure 7:
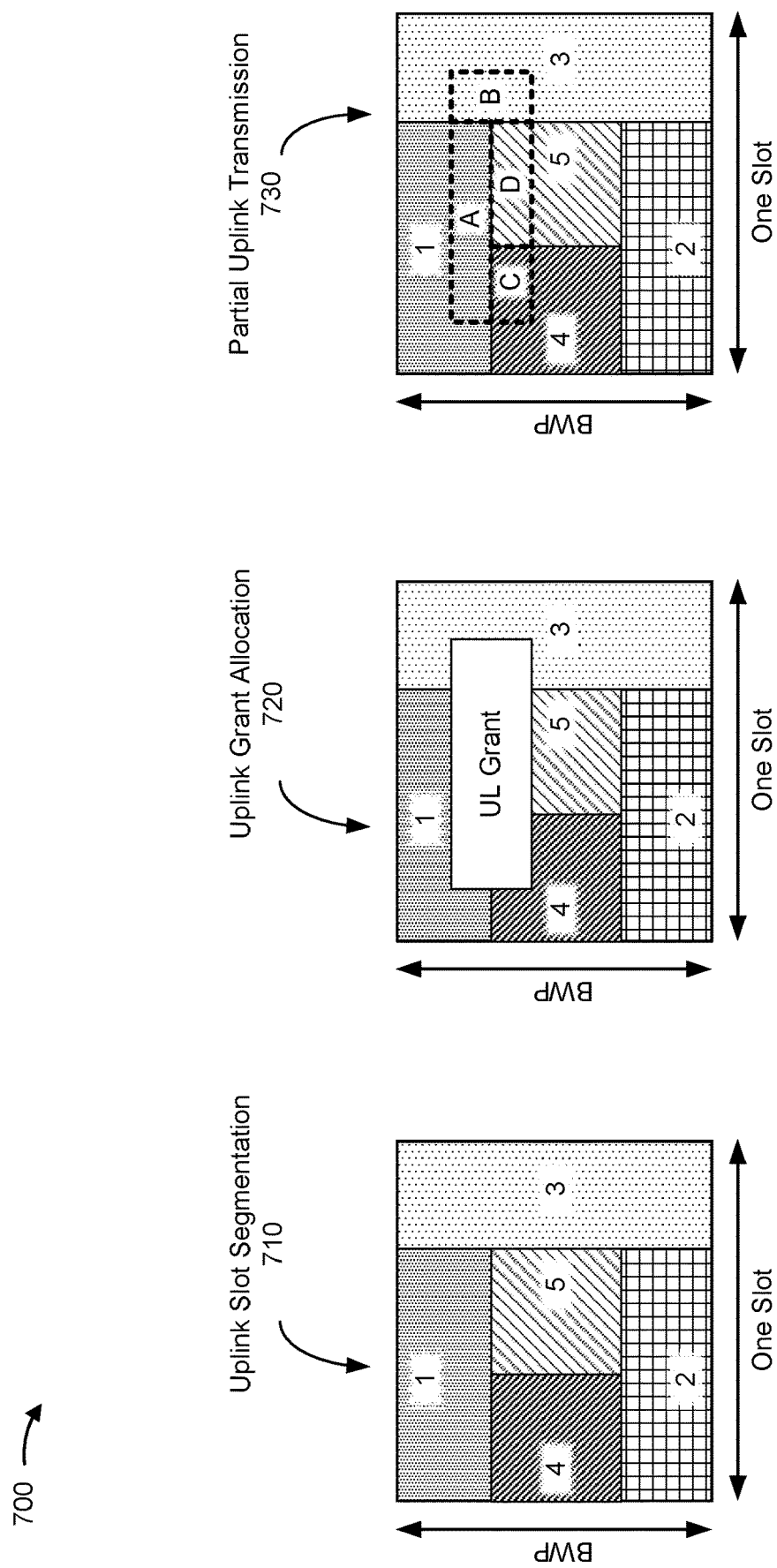
FIG. 7 is a diagram illustrating an example of a partial uplink transmission, in accordance with the present disclosure.

FIG. 7 is a diagram illustrating an example 700 of a partial uplink transmission, in accordance with the present disclosure. As shown by reference number 710, an uplink slot may be segmented such that each slot segment is associated with a skipping order (e.g., 1-5 in the example slot segmentation). As shown by reference number 720, an uplink grant allocation may specify resources allocated for an uplink communication. In this example, the resources of the uplink grant span four of the five slot segments (e.g., slot segments with skipping orders 1, 3, 4, and 5). As shown by reference number 730, the portions of the uplink transmission that are skipped are shown in alphabetical order based on the overlap of the uplink grant and slot segmentation. In this example, resources of the partial uplink transmission are skipped in the order A, B, C, and D, corresponding, respectively, to slot segments 1, 3, 4, and 5.

As indicated above, FIG. 7 is provided as an example. Other examples may differ from what is described with respect to FIG. 7.

Figure 8:
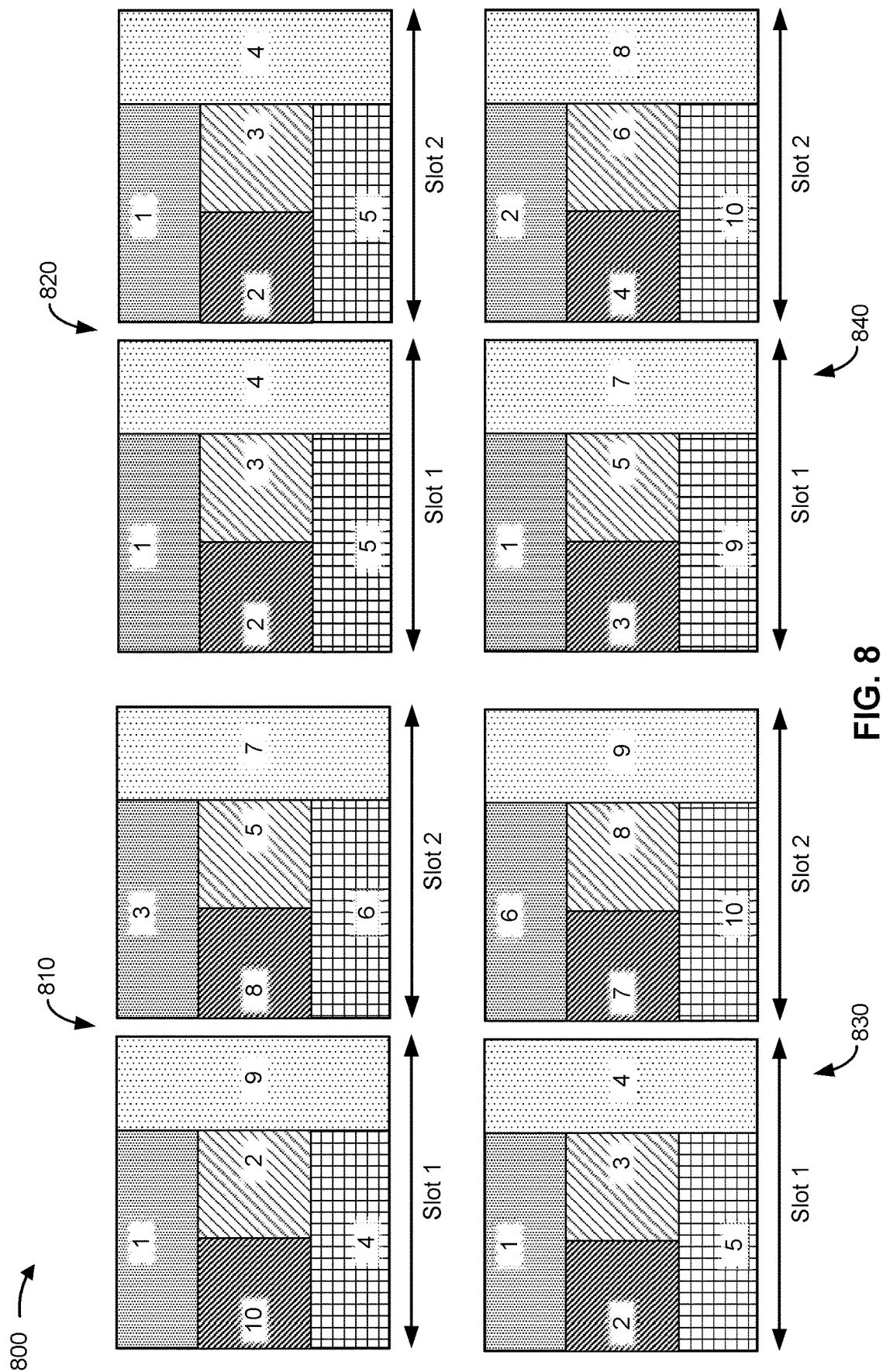
FIG. 8 is a diagram illustrating examples of partial uplink transmissions for transport blocks over multiple slots, in accordance with the present disclosure.

FIG. 8 is a diagram illustrating examples 800 of partial uplink transmissions for transport blocks over multiple slots, in accordance with the present disclosure. Each example depicts two consecutive uplink slots, though other examples may span more than two slots, as described herein.

As shown by reference number 810, the skipping order may span each of the multiple slots, such that some slot segments of the second slot are skipped before some slot segments of the first slot. As shown by reference number 820, the skipping order may be the same for each slot. In this situation, skipping slot segment 1 would skip the same portion of both slots. As shown by reference number 830, the skipping order may be sequential across slots, such that all slot segments of a prior slot are skipped before any slot segments of the subsequent slot. In this example, all slot segments of the first slot are skipped prior to any slot segments of the second slot. In another example (not shown), the opposite may be configured, such that all slot segments of later slots are skipped before any slot segments of earlier slots. As shown by reference number 840, the skipping order may rotate sequentially between uplink slots, such that the first slot segment is in the first slot, the second slot segment in the second slot, the third slot segment back in the first slot, the fourth slot segment in the second slot, and so on.

As indicated above, FIG. 8 is provided as an example. Other examples may differ from what is described with respect to FIG. 8.

Figure 9:
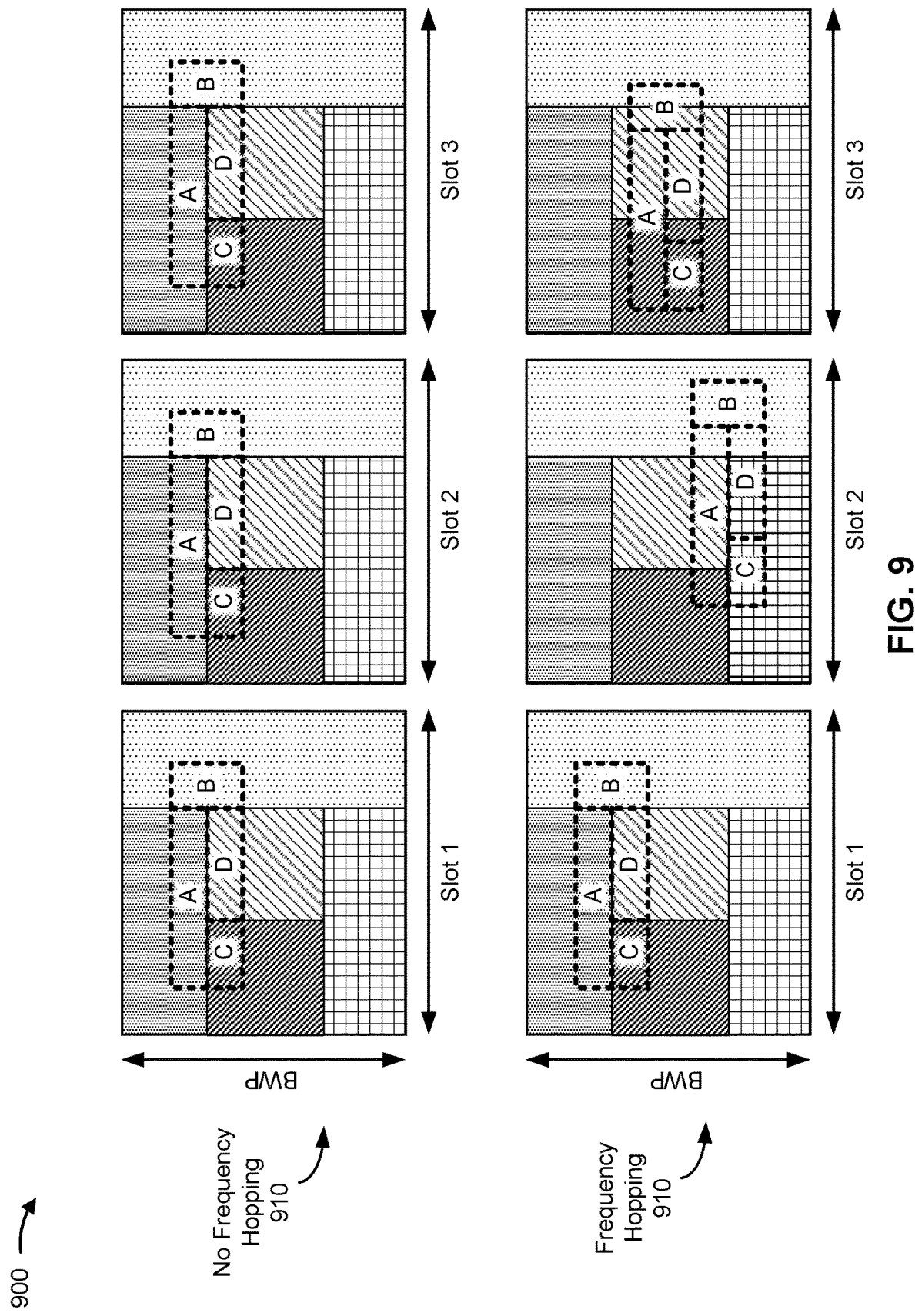
FIG. 9 is a diagram illustrating an example of partial uplink transmissions for physical uplink shared channel (PUSCH) repetitions, in accordance with the present disclosure.

FIG. 9 is a diagram illustrating an example 900 of partial uplink transmissions for PUSCH repetitions, in accordance with the present disclosure. As shown by reference number 910, with no frequency hopping configured, the uplink grant allocates the same resources in each slot associated with each repetition. As shown by reference number 920, with frequency hopping configured, the uplink grant is different for some repetitions, but the resources to be skipped (e.g., depicted by A, B, C, and D) match the first slot such that the repetitions remain consistent.

As indicated above, FIG. 9 is provided as an example. Other examples may differ from what is described with respect to FIG. 9.

Figure 10:
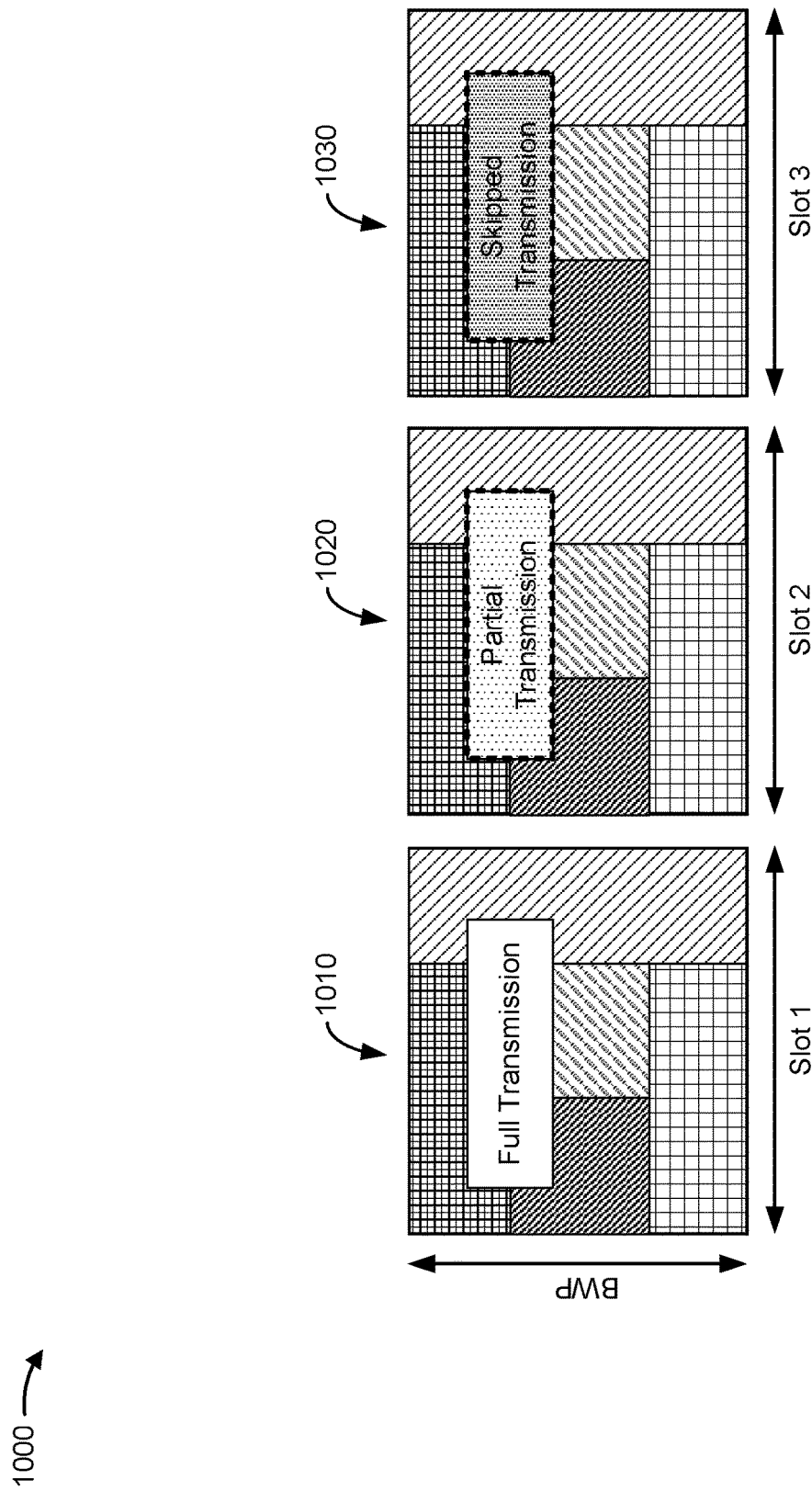
FIG. 10 is a diagram illustrating an example of a multi-slot PUSCH transmission, in accordance with the present disclosure.

FIG. 10 is a diagram illustrating an example 1000 of a multi-slot PUSCH transmission, in accordance with the present disclosure. As shown in FIG. 10, a multi-slot PUSCH may be scheduled for transmission over three uplink slots. As shown by reference number 1010, the first slot may include a full transmission, using all allocated resources of the first slot. As shown by reference number 1020, the second slot may include a partial uplink transmission, with resource skipping as described herein. As shown by reference number 1030, the third slot may be skipped entirely. In this way, resources allocated in later slots of a multi-slot PUSCH may be skipped.

As indicated above, FIG. 10 is provided as an example. Other examples may differ from what is described with respect to FIG. 10.

Figure 11:
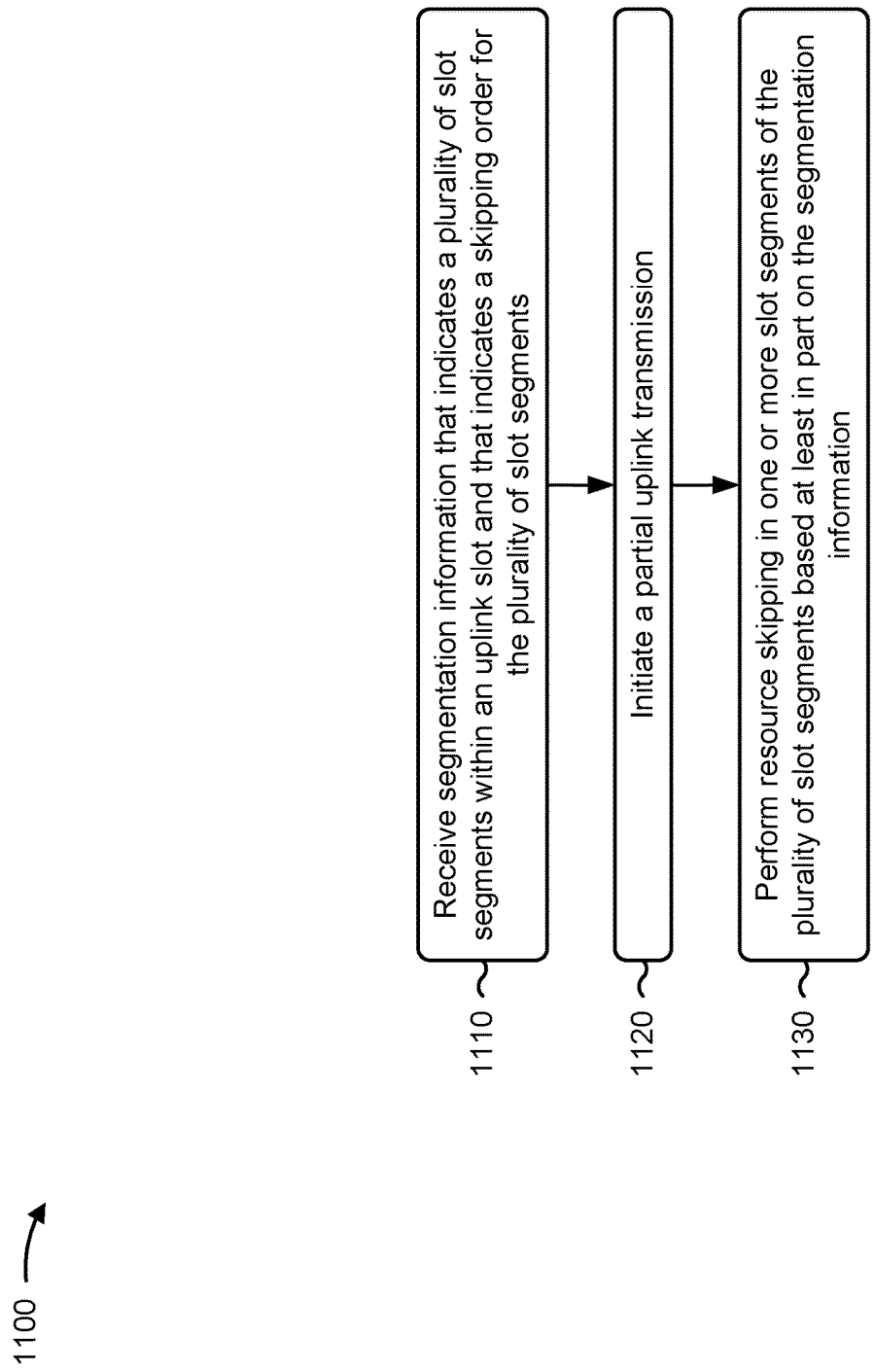
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with resource skipping for partial uplink transmissions.

As shown in FIG. 11, in some aspects, process 1100 mayinclude receiving segmentation information that indicates a plurality of slot segments within an uplink slot and that indicates a skipping order for the plurality of slot segments (block 1110). For example, the UE (e.g., using reception component 1302 and/or communication manager 1306, depicted in FIG. 13) may receive segmentation information that indicates a plurality of slot segments within an uplink slot and that indicates a skipping order for the plurality of slot segments, as described above.

As further shown in FIG. 11, in some aspects, process 1100 mayinclude initiating a partial uplink transmission (block 1120). For example, the UE (e.g., using communication manager 1306, depicted in FIG. 13) may initiate a partial uplink transmission, as described above.

As further shown in FIG. 11, in some aspects, process 1100 mayinclude performing resource skipping in one or more slot segments of the plurality of slot segments based at least in part on the segmentation information (block 1130). For example, the UE (e.g., using communication manager 1306, depicted in FIG. 13) may perform resource skipping in one or more slot segments of the plurality of slot segments based at least in part on the segmentation information, as described above.

Process 1100 mayinclude additional aspects, such as any single aspect or any combination of aspects described below and/or in connection with one or more other processes described elsewhere herein.

In a first aspect, the segmentation information identifies each of the plurality of slot segments in a time domain and a frequency domain by at least one of a symbol index or resource block index.

In a second aspect, alone or in combination with the first aspect, receiving the segmentation information comprises receiving at least a portion of the segmentation information via radio resource control communication.

In a third aspect, alone or in combination with one or more of the first and second aspects, receiving the segmentation information comprises receiving at least a portion of the segmentation information via an uplink grant.

In a fourth aspect, alone or in combination with one or more of the first through third aspects, at least one of the plurality of slot segments or the skipping order are indicated via a radio resource control configured table.

In a fifth aspect, alone or in combination with one or more of the first through fourth aspects, process 1100 includes transmitting an indication for the resource skipping, the indication comprising at least one of an uplink control information index or a demodulation reference signal sequence.

In a sixth aspect, alone or in combination with one or more of the first through fifth aspects, every portion of the uplink slot is associated with one of the plurality of slot segments.

In a seventh aspect, alone or in combination with one or more of the first through sixth aspects, the partial uplink transmission is associated with an uplink grant identifying uplink resources, and the resource skipping is performed based at least in part on an overlap of the uplink resources with the plurality of slot segments.

In an eighth aspect, alone or in combination with one or more of the first through seventh aspects, the partial uplink transmission is associated with an uplink grant for transmission of a transport block over multiple slots.

In a ninth aspect, alone or in combination with one or more of the first through eighth aspects, the skipping order is assigned across the uplink slot and another uplink slot of the multiple slots, and the other uplink slot includes at least one other slot segment ordered for resource skipping prior to at least one slot segment of the plurality of slot segments.

In a tenth aspect, alone or in combination with one or more of the first through ninth aspects, the skipping order rotates between each uplink slot associated with the uplink grant, and sequentially ordered slot segments are in separate uplink slots.

In an eleventh aspect, alone or in combination with one or more of the first through tenth aspects, the uplink slot is a first uplink slot associated with the uplink grant, and the skipping order for the first uplink slot matches another skipping order for a second uplink slot of the multiple slots.

In a twelfth aspect, alone or in combination with one or more of the first through eleventh aspects, performing the resource skipping comprises performing the resource skipping for a first slot segment of the first uplink slot, and performing the resource skipping for a second slot segment of the second uplink slot based at least in part on the second slot segment having a same skipping order as the first slot segment.

In a thirteenth aspect, alone or in combination with one or more of the first through twelfth aspects, the uplink slot is a first uplink slot associated with the uplink grant, and the skipping order indicates that all of the plurality of slot segments within the first uplink slot are ordered for skipping before any slot segments of any subsequent uplink slot of the multiple slots.

In a fourteenth aspect, alone or in combination with one or more of the first through thirteenth aspects, PUSCH repetitions are configured for the partial uplink transmission.

In a fifteenth aspect, alone or in combination with one or more of the first through fourteenth aspects, frequency hopping is configured for the PUSCH repetitions, and a respective partial uplink transmission for each PUSCH repetition matches the partial uplink transmission.

In a sixteenth aspect, alone or in combination with one or more of the first through fifteenth aspects, the uplink slot is one of multiple uplink slots associated with a multi-slot PUSCH communication, all available resources are used for uplink grants prior to the uplink slot, and all uplink grants following the uplink slot are skipped.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
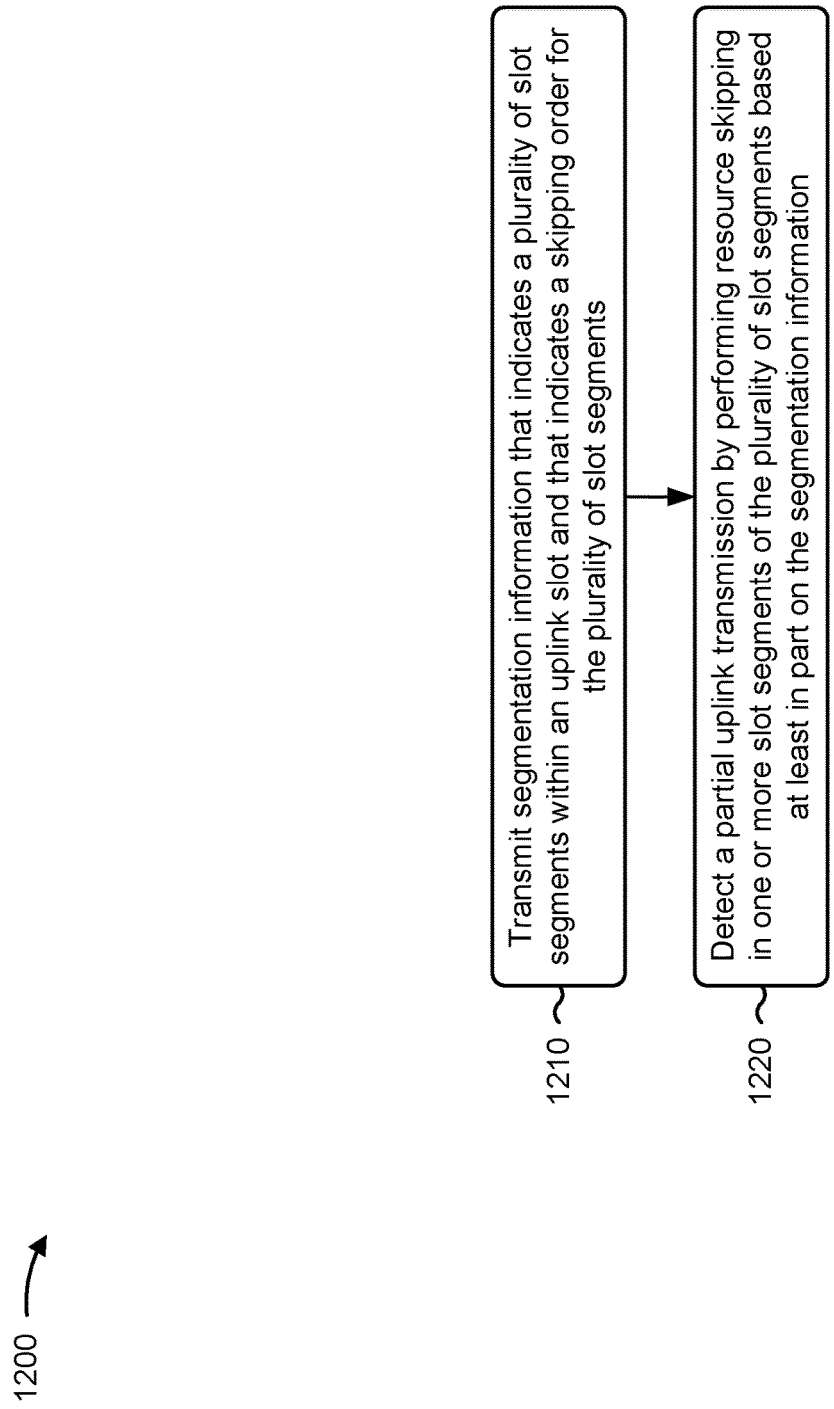
FIG. 12 is a diagram illustrating an example process performed, for example, by a network node, in accordance with the present disclosure.

FIG. 12 is a diagram illustrating an example process 1200 performed, for example, by a network node, in accordance with the present disclosure. Example process 1200 is an example where the network node (e.g., network node 110) performs operations associated with resource skipping for partial uplink transmissions.

As shown in FIG. 12, in some aspects, process 1200 may include transmitting segmentation information that indicates a plurality of slot segments within an uplink slot and that indicates a skipping order for the plurality of slot segments (block 1210). For example, the network node (e.g., using transmission component 1404 and/or communication manager 1406, depicted in FIG. 14) may transmit segmentation information that indicates a plurality of slot segments within an uplink slot and that indicates a skipping order for the plurality of slot segments, as described above.

As further shown in FIG. 12, in some aspects, process 1200 may include detecting a partial uplink transmission by performing resource skipping in one or more slot segments of the plurality of slot segments based at least in part on the segmentation information (block 1220). For example, the network node (e.g., using communication manager 1406, depicted in FIG. 14) may detect a partial uplink transmission by performing resource skipping in one or more slot segments of the plurality of slot segments based at least in part on the segmentation information, as described above.

Process 1200 may include additional aspects, such as any single aspect or any combination of aspects described below and/or in connection with one or more other processes described elsewhere herein.

In a first aspect, the segmentation information identifies each of the plurality of slot segments in a time domain and a frequency domain by at least one of a symbol index or resource block index.

In a second aspect, alone or in combination with the first aspect, transmitting the segmentation information comprises transmitting at least a portion of the segmentation information via radio resource control communication.

In a third aspect, alone or in combination with one or more of the first and second aspects, transmitting the segmentation information comprises transmitting at least a portion of the segmentation information via an uplink grant.

In a fourth aspect, alone or in combination with one or more of the first through third aspects, at least one of the plurality of slot segments or the skipping order are indicated via a radio resource control configured table.

In a fifth aspect, alone or in combination with one or more of the first through fourth aspects, process 1200 includes receiving an indication for the resource skipping, the indication comprising at least one of an uplink control information index or a demodulation reference signal sequence.

In a sixth aspect, alone or in combination with one or more of the first through fifth aspects, every portion of the uplink slot is associated with one of the plurality of slot segments.

In a seventh aspect, alone or in combination with one or more of the first through sixth aspects, the partial uplink transmission is associated with an uplink grant identifying uplink resources, and the resource skipping is performed based at least in part on an overlap of the uplink resources with the plurality of slot segments.

In an eighth aspect, alone or in combination with one or more of the first through seventh aspects, the partial uplink transmission is associated with an uplink grant for transmission of a transport block over multiple slots.

In a ninth aspect, alone or in combination with one or more of the first through eighth aspects, the skipping order is assigned across the uplink slot and another uplink slot of the multiple slots, and the other uplink slot includes at least one other slot segment ordered for resource skipping prior to at least one slot segment of the plurality of slot segments.

In a tenth aspect, alone or in combination with one or more of the first through ninth aspects, the skipping order rotates between each uplink slot associated with the uplink grant, and sequentially ordered slot segments are in separate uplink slots.

In an eleventh aspect, alone or in combination with one or more of the first through tenth aspects, the uplink slot is a first uplink slot associated with the uplink grant, and the skipping order for the first uplink slot matches another skipping order for a second uplink slot of the multiple slots.

In a twelfth aspect, alone or in combination with one or more of the first through eleventh aspects, performing the resource skipping comprises performing the resource skipping for a first slot segment of the first uplink slot, and performing the resource skipping for a second slot segment of the second uplink slot based at least in part on the second slot segment having a same skipping order as the first slot segment.

In a thirteenth aspect, alone or in combination with one or more of the first through twelfth aspects, the uplink slot is a first uplink slot associated with the uplink grant, and the skipping order indicates that all slot segments of the first uplink slot are ordered for skipping before any slot segments of any subsequent uplink slot of the multiple slots.

In a fourteenth aspect, alone or in combination with one or more of the first through thirteenth aspects, PUSCH repetitions are configured for the partial uplink transmission.

In a fifteenth aspect, alone or in combination with one or more of the first through fourteenth aspects, frequency hopping is configured for the PUSCH repetitions, and a respective partial uplink transmission for each PUSCH repetition matches the partial uplink transmission.

In a sixteenth aspect, alone or in combination with one or more of the first through fifteenth aspects, the uplink slot is one of multiple uplink slots associated with a multi-slot PUSCH communication, all available resources are used for uplink grants prior to the uplink slot, and all uplink grants following the uplink slot are skipped.

In a seventeenth aspect, alone or in combination with one or more of the first through sixteenth aspects, process 1200 includes configuring the skipping order based at least in part on one or more communication parameters.

In an eighteenth aspect, alone or in combination with one or more of the first through seventeenth aspects, configuring the skipping order comprises configuring the skipping order to skip at least one of an upper frequency slot segment or a lower frequency slot segment before a middle frequency slot segment.

In a nineteenth aspect, alone or in combination with one or more of the first through eighteenth aspects, configuring the skipping order comprises configuring the skipping order to skip at least one slot segment at a later slot symbol before skipping another slot segment at a slot symbol before the later slot symbol.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
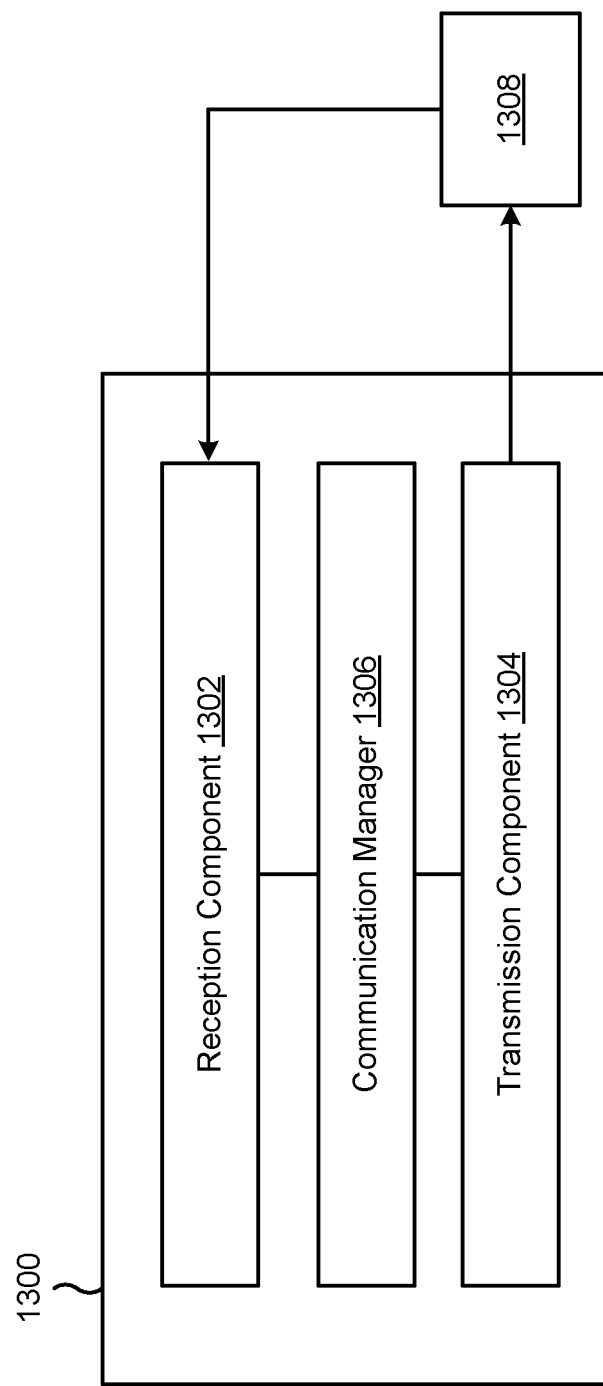
FIGS. 13 and 14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive segmentation information that indicates a plurality of slot segments within an uplink slot and that indicates a skipping order for the plurality of slot segments. The communication manager 1306 may initiate a partial uplink transmission. The communication manager 1306 may perform resource skipping in one or more slot segments of the plurality of slot segments based at least in part on the segmentation information.

The transmission component 1304 may transmit an indication for the resource skipping, the indication comprising at least one of an uplink control information index, or a demodulation reference signal sequence.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
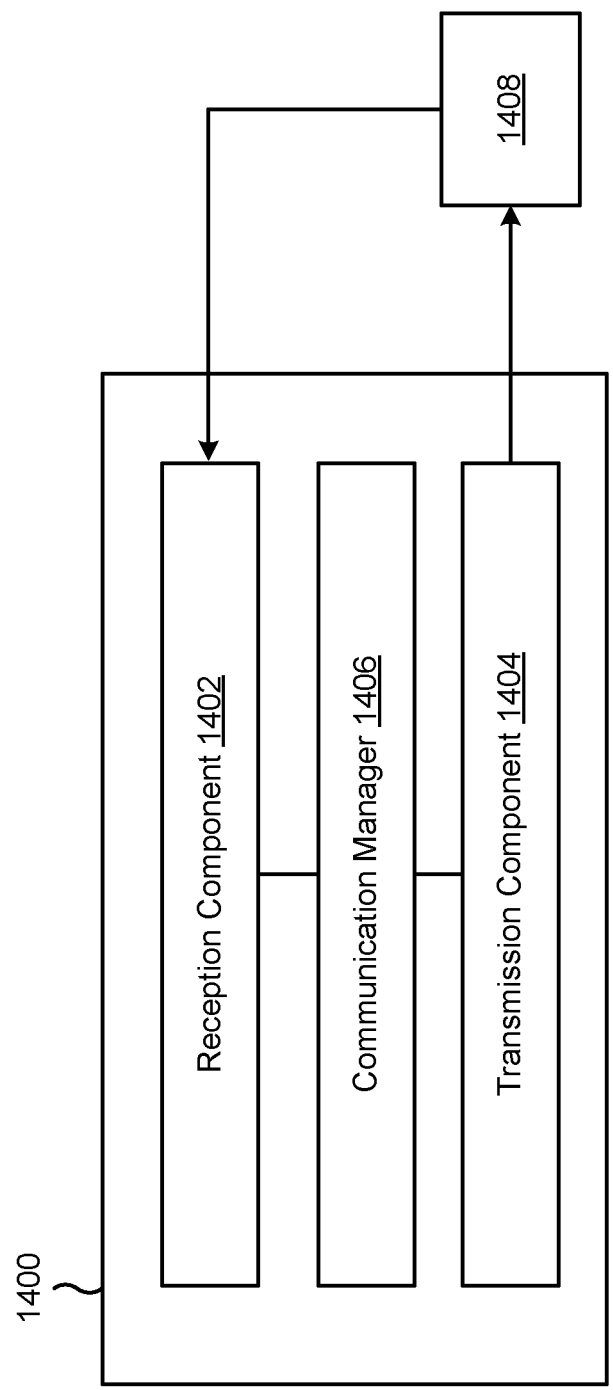

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit segmentation information that indicates a plurality of slot segments within an uplink slot and that indicates a skipping order for the plurality of slot segments. The communication manager 1406 may detect a partial uplink transmission by performing resource skipping in one or more slot segments of the plurality of slot segments based at least in part on the segmentation information.

The reception component 1402 may receive an indication for the resource skipping, the indication comprising at least one of an uplink control information index, or a demodulation reference signal sequence.

The communication manager 1406 may configure the skipping order based at least in part on one or more communication parameters.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a UE, comprising: receiving segmentation information that indicates a plurality of slot segments within an uplink slot and that indicates a skipping order for the plurality of slot segments; initiating a partial uplink transmission; and performing resource skipping in one or more slot segments of the plurality of slot segments based at least in part on the segmentation information.

Aspect 2: The method of Aspect 1, wherein the segmentation information identifies each of the plurality of slot segments in a time domain and a frequency domain by at least one of a symbol index or resource block index.

Aspect 3: The method of any of Aspects 1-2, wherein receiving the segmentation information comprises: receiving at least a portion of the segmentation information via radio resource control communication.

Aspect 4: The method of any of Aspects 1-3, wherein receiving the segmentation information comprises: receiving at least a portion of the segmentation information via an uplink grant.

Aspect 5: The method of any of Aspects 1-4, wherein at least one of the plurality of slot segments or the skipping order are indicated via a radio resource control configured table.

Aspect 6: The method of any of Aspects 1-5, further comprising: transmitting an indication for the resource skipping, the indication comprising at least one of: an uplink control information index, or a demodulation reference signal sequence.

Aspect 7: The method of any of Aspects 1-6, wherein every portion of the uplink slot is associated with one of the plurality of slot segments.

Aspect 8: The method of any of Aspects 1-7, wherein the partial uplink transmission is associated with an uplink grant identifying uplink resources, and wherein the resource skipping is performed based at least in part on an overlap of the uplink resources with the plurality of slot segments.

Aspect 9: The method of any of Aspects 1-8, wherein the partial uplink transmission is associated with an uplink grant for transmission of a transport block over multiple slots.

Aspect 10: The method of Aspect 9, wherein the skipping order is assigned across the uplink slot and another uplink slot of the multiple slots, and the other uplink slot includes at least one other slot segment ordered for resource skipping prior to at least one slot segment of the plurality of slot segments.

Aspect 11: The method of Aspect 10, wherein the skipping order rotates between each uplink slot associated with the uplink grant, and sequentially ordered slot segments are in separate uplink slots.

Aspect 12: The method of Aspect 9, wherein the uplink slot is a first uplink slot associated with the uplink grant, and wherein the skipping order for the first uplink slot matches another skipping order for a second uplink slot of the multiple slots.

Aspect 13: The method of Aspect 12, wherein performing the resource skipping comprises: performing the resource skipping for a first slot segment of the first uplink slot, and performing the resource skipping for a second slot segment of the second uplink slot based at least in part on the second slot segment having a same skipping order as the first slot segment.

Aspect 14: The method of Aspect 9, wherein the uplink slot is a first uplink slot associated with the uplink grant, and wherein the skipping order indicates that all of the plurality of slot segments within the first uplink slot are ordered for skipping before any slot segments of any subsequent uplink slot of the multiple slots.

Aspect 15: The method of any of Aspects 1-14, wherein PUSCH repetitions are configured for the partial uplink transmission.

Aspect 16: The method of Aspect 15, wherein frequency hopping is configured for the PUSCH repetitions; and wherein a respective partial uplink transmission for each PUSCH repetition matches the partial uplink transmission.

Aspect 17: The method of any of Aspects 1-16, wherein the uplink slot is one of multiple uplink slots associated with a multi-slot PUSCH communication, and wherein all available resources are used for uplink grants prior to the uplink slot, and wherein all uplink grants following the uplink slot are skipped.

Aspect 18: A method of wireless communication performed by a network node, comprising: transmitting segmentation information that indicates a plurality of slot segments within an uplink slot and that indicates a skipping order for the plurality of slot segments; and detecting a partial uplink transmission by performing resource skipping in one or more slot segments of the plurality of slot segments based at least in part on the segmentation information.

Aspect 19: The method of Aspect 18, wherein the segmentation information identifies each of the plurality of slot segments in a time domain and a frequency domain by at least one of a symbol index or resource block index.

Aspect 20: The method of any of Aspects 18-19, wherein transmitting the segmentation information comprises: transmitting at least a portion of the segmentation information via radio resource control communication.

Aspect 21: The method of any of Aspects 18-20, wherein transmitting the segmentation information comprises: transmitting at least a portion of the segmentation information via an uplink grant.

Aspect 22: The method of any of Aspects 18-21, wherein at least one of the plurality of slot segments or the skipping order are indicated via a radio resource control configured table.

Aspect 23: The method of any of Aspects 18-22, further comprising: receiving an indication for the resource skipping, the indication comprising at least one of: an uplink control information index, or a demodulation reference signal sequence.

Aspect 24: The method of any of Aspects 18-23, wherein every portion of the uplink slot is associated with one of the plurality of slot segments.

Aspect 25: The method of any of Aspects 18-24, wherein the partial uplink transmission is associated with an uplink grant identifying uplink resources, and wherein the resource skipping is performed based at least in part on an overlap of the uplink resources with the plurality of slot segments.

Aspect 26: The method of any of Aspects 18-25, wherein the partial uplink transmission is associated with an uplink grant for transmission of a transport block over multiple slots.

Aspect 27: The method of Aspect 26, wherein the skipping order is assigned across the uplink slot and another uplink slot of the multiple slots, and the other uplink slot includes at least one other slot segment ordered for resource skipping prior to at least one slot segment of the plurality of slot segments.

Aspect 28: The method of Aspect 27, wherein the skipping order rotates between each uplink slot associated with the uplink grant, and sequentially ordered slot segments are in separate uplink slots.

Aspect 29: The method of Aspect 26, wherein the uplink slot is a first uplink slot associated with the uplink grant, and wherein the skipping order for the first uplink slot matches another skipping order for a second uplink slot of the multiple slots.

Aspect 30: The method of Aspect 29, wherein performing the resource skipping comprises: performing the resource skipping for a first slot segment of the first uplink slot, and performing the resource skipping for a second slot segment of the second uplink slot based at least in part on the second slot segment having a same skipping order as the first slot segment.

Aspect 31: The method of Aspect 26, wherein the uplink slot is a first uplink slot associated with the uplink grant, and wherein the skipping order indicates that all slot segments of the first uplink slot are ordered for skipping before any slot segments of any subsequent uplink slot of the multiple slots.

Aspect 32: The method of any of Aspects 18-31, wherein PUSCH repetitions are configured for the partial uplink transmission.

Aspect 33: The method of Aspect 32, wherein frequency hopping is configured for the PUSCH repetitions; and wherein a respective partial uplink transmission for each PUSCH repetition matches the partial uplink transmission.

Aspect 34: The method of any of Aspects 18-33, wherein the uplink slot is one of multiple uplink slots associated with a multi-slot PUSCH communication, and wherein all available resources are used for uplink grants prior to the uplink slot, and wherein all uplink grants following the uplink slot are skipped.

Aspect 35: The method of any of Aspects 18-34, further comprising: configuring the skipping order based at least in part on one or more communication parameters.

Aspect 36: The method of Aspect 35, wherein configuring the skipping order comprises: configuring the skipping order to skip at least one of an upper frequency slot segment or a lower frequency slot segment before a middle frequency slot segment.

Aspect 37: The method of Aspect 35, wherein configuring the skipping order comprises: configuring the skipping order to skip at least one slot segment at a later slot symbol before skipping another slot segment at a slot symbol before the later slot symbol.

Aspect 38: An apparatus for wireless communication at a device, comprising a processor; memory coupled with the processor; and instructions stored in the memory and executable by the processor to cause the apparatus to perform the method of one or more of Aspects 1-17.

Aspect 39: An apparatus for wireless communication at a device, comprising a processor; memory coupled with the processor; and instructions stored in the memory and executable by the processor to cause the apparatus to perform the method of one or more of Aspects 18-37.

Aspect 40: A device for wireless communication, comprising a memory and one or more processors coupled to the memory, the one or more processors configured to perform the method of one or more of Aspects 1-17.

Aspect 41: A device for wireless communication, comprising a memory and one or more processors coupled to the memory, the one or more processors configured to perform the method of one or more of Aspects 18-37.

Aspect 42: An apparatus for wireless communication, comprising at least one means for performing the method of one or more of Aspects 1-17.

Aspect 43: An apparatus for wireless communication, comprising at least one means for performing the method of one or more of Aspects 18-37.

Aspect 44: A non-transitory computer-readable medium storing code for wireless communication, the code comprising instructions executable by a processor to perform the method of one or more of Aspects 1-17.

Aspect 45: A non-transitory computer-readable medium storing code for wireless communication, the code comprising instructions executable by a processor to perform the method of one or more of Aspects 18-37.

Aspect 46: A non-transitory computer-readable medium storing a set of instructions for wireless communication, the set of instructions comprising one or more instructions that, when executed by one or more processors of a device, cause the device to perform the method of one or more of Aspects 1-17.

Aspect 47: A non-transitory computer-readable medium storing a set of instructions for wireless communication, the set of instructions comprising one or more instructions that, when executed by one or more processors of a device, cause the device to perform the method of one or more of Aspects 18-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" maydepending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured individually or collectively to:
receive segmentation information that indicates a plurality of slot segments within an uplink slot and that indicates a skipping order for the plurality of slot segments;
initiate a partial uplink transmission; and
perform resource skipping in one or more slot segments of the plurality of slot segments based at least in part on the segmentation information.

2. The UE of claim 1, wherein the segmentation information identifies each of the plurality of slot segments in a time domain and a frequency domain by at least one of a symbol index or resource block index.

3. The UE of claim 1, wherein the one or more processors, to receive the segmentation information, are configured individually or collectively to:
receive at least a portion of the segmentation information via radio resource control communication.

4. The UE of claim 1, wherein the one or more processors, to receive the segmentation information, are configured individually or collectively to:
receive at least a portion of the segmentation information via an uplink grant.

5. The UE of claim 1, wherein at least one of the plurality of slot segments or the skipping order are indicated via a radio resource control configured table.

6. The UE of claim 1, wherein the one or more processors are further configured, individually or collectively, to:
transmit an indication for the resource skipping, the indication comprising at least one of:
an uplink control information index, or
a demodulation reference signal sequence.

7. The UE of claim 1, wherein every portion of the uplink slot is associated with one of the plurality of slot segments.

8. The UE of claim 1, wherein the partial uplink transmission is associated with an uplink grant identifying uplink resources, and wherein the resource skipping is performed based at least in part on an overlap of the uplink resources with the plurality of slot segments.

9. The UE of claim 1, wherein the partial uplink transmission is associated with an uplink grant for transmission of a transport block over multiple slots.

10. The UE of claim 9, wherein the skipping order is assigned across the uplink slot and another uplink slot of the multiple slots, and the other uplink slot includes at least one other slot segment ordered for resource skipping prior to at least one slot segment of the plurality of slot segments.

11. The UE of claim 10, wherein the skipping order rotates between each uplink slot associated with the uplink grant, and sequentially ordered slot segments are in separate uplink slots.

12. The UE of claim 9, wherein the uplink slot is a first uplink slot associated with the uplink grant, and wherein the skipping order for the first uplink slot matches another skipping order for a second uplink slot of the multiple slots.

13. The UE of claim 12, wherein the one or more processors, to perform the resource skipping, are configured individually or collectively to:
perform the resource skipping for a first slot segment of the first uplink slot, and
perform the resource skipping for a second slot segment of the second uplink slot based at least in part on the second slot segment having a same skipping order as the first slot segment.

14. The UE of claim 9, wherein the uplink slot is a first uplink slot associated with the uplink grant, and wherein the skipping order indicates that all of the plurality of slot segments within the first uplink slot are ordered for skipping before any slot segments of any subsequent uplink slot of the multiple slots.

15. The UE of claim 1, wherein physical uplink shared channel (PUSCH) repetitions are configured for the partial uplink transmission.

16. The UE of claim 15, wherein frequency hopping is configured for the PUSCH repetitions; and
wherein a respective partial uplink transmission for each PUSCH repetition matches the partial uplink transmission.

17. The UE of claim 1, wherein the uplink slot is one of multiple uplink slots associated with a multi-slot physical uplink shared channel (PUSCH) communication, and
wherein all available resources are used for uplink grants prior to the uplink slot, and
wherein all uplink grants following the uplink slot are skipped.

18. A network node for wireless communication, comprising:
one or more memories; and
one or more processors, coupled to the one or more memories, configured individually or collectively to:
transmit segmentation information that indicates a plurality of slot segments within an uplink slot and that indicates a skipping order for the plurality of slot segments; and
detect a partial uplink transmission by performing resource skipping in one or more slot segments of the plurality of slot segments based at least in part on the segmentation information.

19. The network node of claim 18, wherein the segmentation information identifies each of the plurality of slot segments in a time domain and a frequency domain by at least one of a symbol index or resource block index.

20. The network node of claim 18, wherein the one or more processors, to transmit the segmentation information, are configured individually or collectively to:
transmit at least a portion of the segmentation information via radio resource control communication.

21. The network node of claim 18, wherein the one or more processors, to transmit the segmentation information, are configured individually or collectively to:
transmit at least a portion of the segmentation information via an uplink grant.

22. The network node of claim 18, wherein at least one of the plurality of slot segments or the skipping order are indicated via a radio resource control configured table.

23. The network node of claim 18, wherein the one or more processors are further configured, individually or collectively, to:
receive an indication for the resource skipping, the indication comprising at least one of:
an uplink control information index, or
a demodulation reference signal sequence.

24. The network node of claim 18, wherein the partial uplink transmission is associated with an uplink grant identifying uplink resources, and wherein the resource skipping is performed based at least in part on an overlap of the uplink resources with the plurality of slot segments.

25. The network node of claim 18, wherein the partial uplink transmission is associated with an uplink grant for transmission of a transport block over multiple slots.

26. The network node of claim 18, wherein the one or more processors are further configured, individually or collectively, to:
configure the skipping order based at least in part on one or more communication parameters.

27. The network node of claim 26, wherein the one or more processors, to configure the skipping order, are configured individually or collectively to:
configure the skipping order to skip at least one of an upper frequency slot segment or a lower frequency slot segment before a middle frequency slot segment.

28. The network node of claim 26, wherein the one or more processors, to configure the skipping order, are configured individually or collectively to:
configure the skipping order to skip at least one slot segment at a later slot symbol before skipping another slot segment at a slot symbol before the later slot symbol.

29. A method of wireless communication performed by a user equipment (UE), comprising:
receiving segmentation information that indicates a plurality of slot segments within an uplink slot and that indicates a skipping order for the plurality of slot segments;
initiating a partial uplink transmission; and
performing resource skipping in one or more slot segments of the plurality of slot segments based at least in part on the segmentation information.

30. A method of wireless communication performed by a network node, comprising:
transmitting segmentation information that indicates a plurality of slot segments within an uplink slot and that indicates a skipping order for the plurality of slot segments; and
detecting a partial uplink transmission by performing resource skipping in one or more slot segments of the plurality of slot segments based at least in part on the segmentation information.

* * * * *